(12) United States Patent
Bishop

(10) Patent No.: US 9,387,810 B1
(45) Date of Patent: Jul. 12, 2016

(54) VEHICLE GARMENT HANGING DEVICE

(71) Applicant: Jerry W Bishop, Destin, FL (US)

(72) Inventor: Jerry W Bishop, Destin, FL (US)

(*) Notice: Subject to any disclaimer, the term of this patent is extended or adjusted under 35 U.S.C. 154(b) by 0 days.

(21) Appl. No.: 14/522,657

(22) Filed: Oct. 24, 2014

Related U.S. Application Data

(63) Continuation-in-part of application No. 14/285,708, filed on May 23, 2014, now Pat. No. 9,290,133.

(51) Int. Cl.
| | | |
|---|---|---|
| *A47H 1/02* | (2006.01) | |
| *A47H 1/00* | (2006.01) | |
| *A47F 7/00* | (2006.01) | |
| *A47K 10/00* | (2006.01) | |
| *B60R 7/10* | (2006.01) | |
| *B60R 7/04* | (2006.01) | |
| *A47F 5/00* | (2006.01) | |
| *A47F 5/08* | (2006.01) | |
| *A47G 25/06* | (2006.01) | |
| *A47H 1/122* | (2006.01) | |
| *A47H 1/102* | (2006.01) | |
| *B60R 11/00* | (2006.01) | |

(52) U.S. Cl.
CPC ............... *B60R 7/10* (2013.01); *A47F 5/0006* (2013.01); *A47F 5/0884* (2013.01); *A47G 25/0692* (2013.01); *A47H 1/02* (2013.01); *A47H 1/102* (2013.01); *A47H 1/122* (2013.01); *B60R 7/04* (2013.01); *B60R 11/00* (2013.01); *B60R 2011/008* (2013.01); *B60R 2011/0019* (2013.01)

(58) Field of Classification Search
CPC .......... B60R 7/005; B60R 7/04; B60R 7/043; B60R 7/046; B60R 7/05; B60R 7/06; B60R 7/08; B60R 7/12; B60R 7/14; B60R 7/10; B60R 11/00; B60R 2011/008; B60R 2011/0019; A47H 1/02; A47H 1/022; A47H 1/03; A47H 1/10; A47H 1/102; A47H 1/12; A47H 1/122; A47H 1/14; A47H 1/142; A47H 2001/006; A47H 2001/0215; A47K 10/04; A47K 10/10; A47K 10/18; A47B 61/003; A47B 43/003; A47B 43/006; A47B 61/02; A47G 25/0692; A47G 25/746; A47G 25/1478; A47G 25/743; A47G 27/06; A47G 25/14; B65D 85/185; D06F 57/12; A47F 5/0884; A47F 5/0006; A47F 2005/0012; A47F 7/143; A47F 5/08; A47F 5/0892
USPC .......... 211/100, 101, 193, 119.003, 118, 113, 211/85.3, 123, 124, 105.1, 175, 119.011; 248/690, 693, 301, 304, 339; 224/405, 224/482, 313, 322, 311, 927
See application file for complete search history.

(56) References Cited

U.S. PATENT DOCUMENTS 579,973 A * 4/1897 Frank ...................... 211/119.08
744,701 A * 11/1903 Pederson .................... 211/85.3

(Continued)

*Primary Examiner* — Jennifer E Novosad
(74) *Attorney, Agent, or Firm* — Peter Loffler

(57) ABSTRACT

A device is removably secured within a vehicle and allows multiple hangers to be properly positioned on the device for clothing transport. The device uses a bar member and a flexible ladder hook with a bar opening that slidably receives the bar member. A series of hook openings are located on the ladder hook above the bar opening. The ladder hook is hooked onto a garment hook via one of the hook openings. An end cap is located on one end of the bar member while a securement cap is located on the opposing end. The securement cap abuts against the roof and possibly a window of the vehicle to add a second point of support for the device when bearing weight.

20 Claims, 3 Drawing Sheets

(56) References Cited

U.S. PATENT DOCUMENTS

| | | | |
|---|---|---|---|
| 2,461,722 A * | 2/1949 | Coons | 224/482 |
| 2,500,423 A * | 3/1950 | Martin | 224/549 |
| 2,503,602 A * | 4/1950 | Titley | 5/94 |
| 2,528,358 A * | 10/1950 | Grass | 248/251 |
| 2,549,712 A * | 4/1951 | Schwartz | 224/482 |
| 2,609,104 A * | 9/1952 | Leach | 224/482 |
| 2,640,634 A * | 6/1953 | Francis | 224/550 |
| 2,777,624 A * | 1/1957 | Nelson | 224/313 |
| 3,540,601 A * | 11/1970 | Hutchison | 211/32 |
| 3,687,499 A * | 8/1972 | Guilfoyle, Sr. | 403/292 |
| 4,074,882 A * | 2/1978 | Anderson | 248/208 |
| 4,094,414 A * | 6/1978 | Thiot et al. | 211/1.3 |
| 4,123,024 A * | 10/1978 | Levy | 248/214 |
| 4,209,099 A * | 6/1980 | Wickes | 211/182 |
| 4,518,089 A * | 5/1985 | Campbell | 211/118 |
| 4,778,089 A * | 10/1988 | White et al. | 224/561 |
| 4,819,812 A * | 4/1989 | Demarest, Jr. | 211/1.3 |
| 4,972,961 A * | 11/1990 | Roesch | 211/116 |
| 5,104,083 A * | 4/1992 | Shannon | 248/339 |
| 5,137,158 A * | 8/1992 | Brockway | 211/106.01 |
| 5,299,696 A * | 4/1994 | Sheng | 211/123 |
| 5,810,180 A * | 9/1998 | Chan | 211/117 |
| 6,220,489 B1 * | 4/2001 | Sato | 223/94 |
| 6,299,118 B1 * | 10/2001 | Farrell | 248/327 |
| 2002/0153337 A1 * | 10/2002 | Shuen | 211/123 |
| 2004/0182806 A1 * | 9/2004 | Figueroa | 211/105.4 |
| 2005/0092795 A1 * | 5/2005 | Matthew et al. | 224/313 |
| 2008/0251673 A1 * | 10/2008 | Mammi | 248/339 |
| 2010/0044403 A1 * | 2/2010 | Humphreys | 223/88 |

* cited by examiner

VEHICLE GARMENT HANGING DEVICE

This application is a Continuation-In-Part of U.S. patent application Ser. No. 14/285,708 filed on May 23, 2014, which application is incorporated herein by reference.

BACKGROUND OF THE INVENTION

1. Field of the Invention

The present invention relates to a device that removably attaches to a garment hook or a passenger grab bar within a vehicle, such that clothes on a hanger can be supported from the device.

2. Background of the Prior Art

Many people want to take clothes with them when traveling by vehicle. A person may want to take a business suit in the vehicle to change into after a workout at the gym or take more formal clothes for a social function after work when there is not enough time to go home and change. Such situations tend not to be problematic as the person simply places the desired clothes onto a hanger and the hanger is hung from the hook located in the vehicle for such purpose, typically in the back seat area of the passenger compartment, or absent such a hook, from the passenger grab bar. When the clothing is desired, the hanger is removed from the hook or grab bar and the job is finished.

Problems arise when multiple items of clothing need to be transported, such as when a person is going on a weekend getaway and does not want to fold his or her clothes into a suitcase or on the back seat or a person is simply picking up multiple freshly cleaned and pressed items from the dry cleaners. Typically the hook can support one or at best two hangers which may prove too little capacity for a person with multiple items of clothing on hangers. While a grab bar may support more than a couple of hangers, placement of multiple items of clothing on multiple hangers onto a grab bar tends to scrunch the clothing items together, often wrinkling them so that the clothing items do not fare any better than being laid on the back seat of the vehicle.

One way to overcome this problem is the use of a hanger rod that stretches between the interior sides of the vehicle, the hanger rod being a tension bar that is supported against the sides of the vehicle via the biasing of the hanger bar's internal springs. The hanger bar is capable of carrying a substantial number of clothing items allowing the items to remain separated during the journey so as to reduce the risk of wrinkling and folding of the items. While effective, the hanger bar is not without problems. One problem with the hanger bar is that depending on the slope of the interior side wall of the vehicle, the tension bar may not get a sufficient grip on the side walls and be prone to slippage, especially if the clothing load is large. Additionally, many drivers simply get distracted by a bar that is positioned across the rear window of the vehicle. Further, depending on the architecture of the vehicle, the hanger bar must be positioned so as to leave no room for rear seat passengers.

To address these hanger bar problems, devices have been proposed that are located on one side of the vehicle and extend out a relatively short distance from the side wall (which includes the lower section of the roof line), which distance is sufficient to be able to hold sufficient clothing items for most people's needs. As such devices only protrude a short distance from a vehicle's interior side wall, they tend to not unduly distract the driver of the vehicle and do not rob back seat passengers of their seating real estate.

However, these prior art devices also have their shortcomings. Many of the devices are relatively complex in design and construction so as to be cost-prohibitive to produce so as to be economically unattractive to the average consumer. Some devices require elaborate installation, often with the attendant requirement of the need to make a permanent alteration to the vehicle, which many vehicle owners are unwilling to undertake. Still some devices have only a single point of support, that being at the attachment of the device to the vehicle hook, so that relatively heavy clothing loads cannot be supported by such devices.

What is needed is a device that allows a person to be able to hang multiple clothing items, separated from one another, within a vehicle, which device overcomes the above stated shortcoming found in the art. Specifically, such a device must not stretch across the entire vehicle passenger compartment so as to not be distractive to the driver of the vehicle and so as to not prevent passengers from occupying the back seat of the vehicle. Such a device must be relatively simple in design and construction and must be easy to install into and remove from the vehicle without the need to make permanent alterations to the vehicle. The device must be able to support a relatively heavy clothing load.

SUMMARY OF THE INVENTION

The vehicle garment hanging device of the present invention addresses the aforementioned needs in the art by providing a device that quickly and easily hangs in the passenger compartment of a vehicle and holds multiple items of clothing in a manner so as to prevent such clothing items from becoming wrinkled. The vehicle garment hanging device is supported on a single side of the vehicle so as to not be an undue distraction to the driver and so as not to make the back seat area uninhabitable for passengers. The vehicle garment hanging device is of relatively simple design and construction, being produced using standard manufacturing techniques, so as to be economically attractive to potential consumers for this type of product. Installation of the vehicle garment hanging device within the vehicle is quick, does not require any tools, and does not require any alterations, permanent or temporary, to be made to the vehicle. The vehicle garment hanging device has dual points of load support so that a relatively heavy clothing load supported by the device.

The vehicle garment hanging device is comprised of a bar member that has a first end, an opposing second end, and a medial section therebetween. A flexible ladder hook has a top end and a bottom end. The ladder hook has a bar opening located proximate the bottom end and has a plurality of hook openings located between the bar opening and the top end such that the bar member slidably passes through the bar opening. An end cap is located on the first end of the bar member while a securement cap having a proximal end, a distal end, an upper surface and a lower surface, is located on the bar member. The shape of the bar opening of the ladder hook corresponds to the shape of an outer surface of the bar member so that once the bar member is slid into position with respect to the ladder hook, the bar member is frictionally held in position thereat. Each of the hook openings of the ladder hook may be semi-circular in shape. The upper surface of the securement cap is downwardly curved from the proximal end to the distal end so that the distal end of the securement cap is rounded. At least the upper surface and the distal end of the securement cap are each rubberized or otherwise appropriately coated to help prevent causing scuff and tear damage to the roof of the vehicle in which the device is installed.

BRIEF DESCRIPTION OF THE DRAWINGS

Similar reference numerals refer to similar parts throughout the several views of the drawings.

DESCRIPTION OF THE PREFERRED EMBODIMENT

Figure 1:
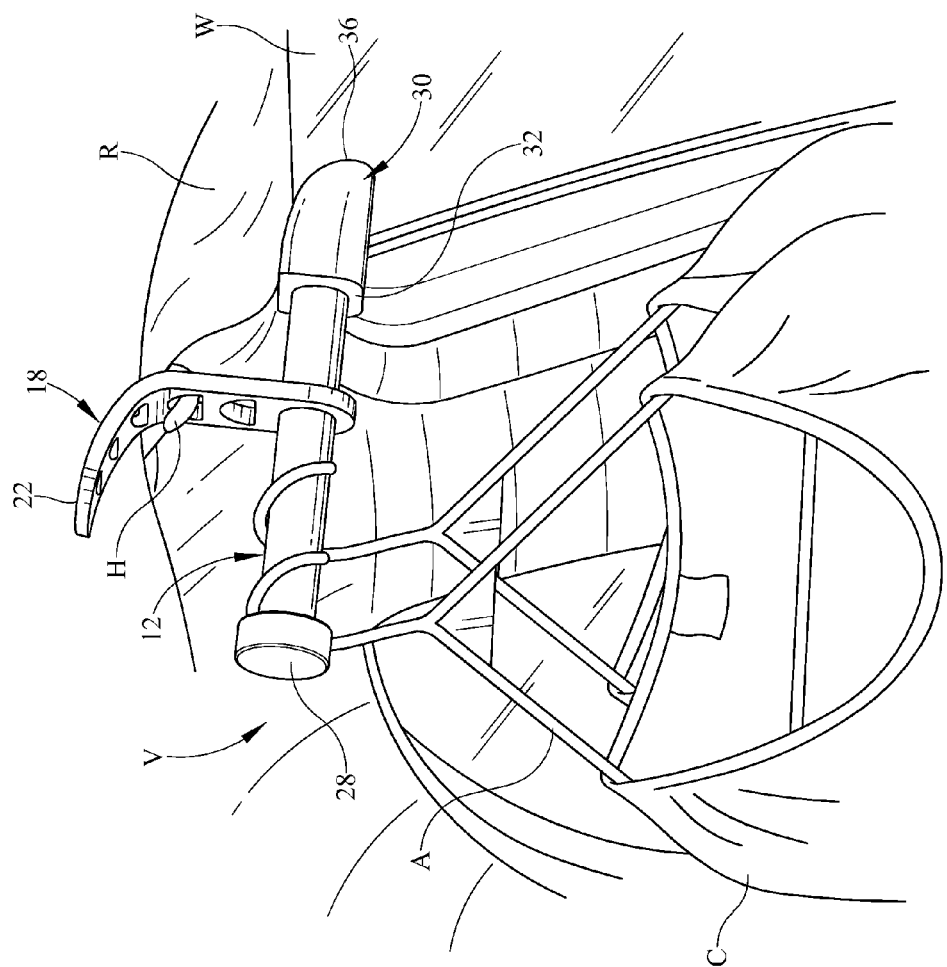
FIG. 1 is an environmental view of the vehicle garment hanging device of the present invention installed within a vehicle.
Figure 2:
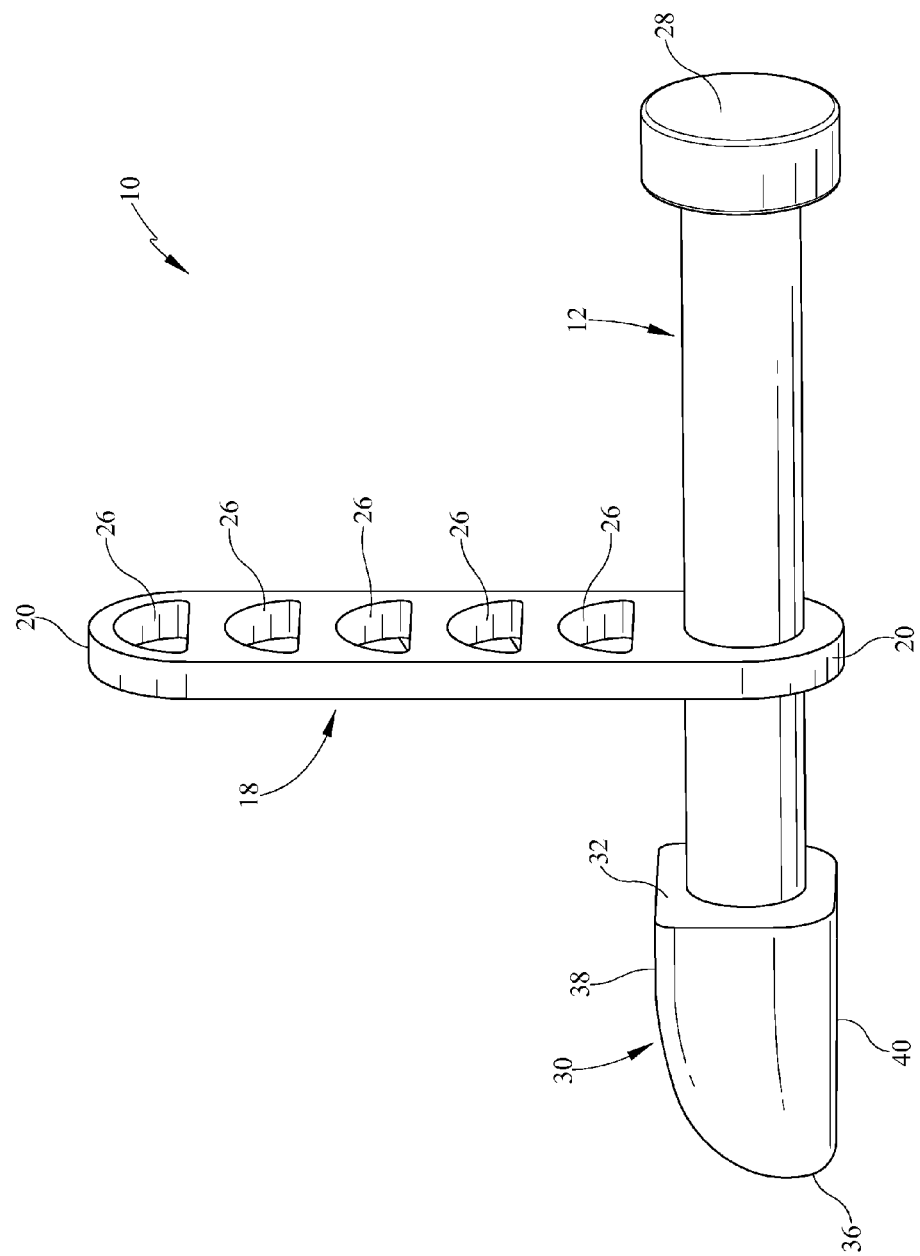
FIG. 2 is a perspective view of the vehicle garment hanging device.
Figure 3:
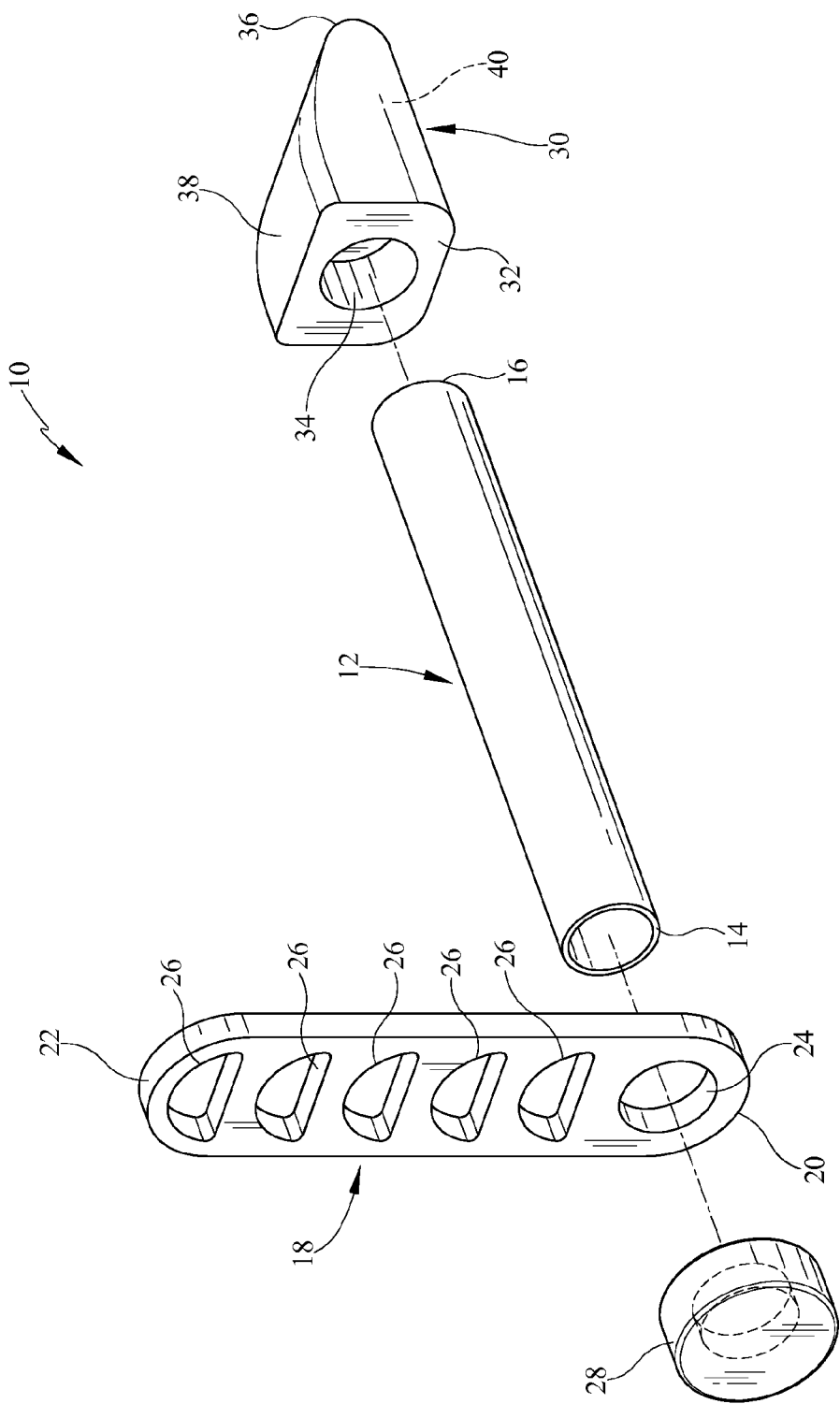
FIG. 3 is an exploded perspective view of the vehicle garment hanging device.

Referring now to the drawings, it is seen that the vehicle garment hanging device of the present invention, generally denoted by reference numeral 10, is comprised of a an elongate bar member 12, which may be made from any appropriate material, such as PVC, etc., that has a first end 14 and a second end 16. A ladder hook 18 is a flexible member that has a bottom end 20 and a top end 22. Located proximate the bottom end 20 is a bar opening 24 that is dimensioned to match the outer shape of the bar member 12 so that the bar member 12 passes through the bar opening 24 of the ladder hook 18, allowing the ladder hook 18 to slide along the length of the bar member 12. A series of hook openings 26 are located along the length of the ladder hook 18 above the bar opening 24. The hook openings 26 may but need not necessarily be semi-circular in shape so as to approximately match the contours of a vehicle's garment hooks H. The ladder hook 18, in order to be flexible, is made from rubber or similar material so that once the ladder hook 18 is slid along the bar member 12 to a desired location, as more fully explained below, the ladder hook 18 is friction held thereat.

An end cap 28 is located on the first end 14 of the bar member 12. The end cap 28 may be removably attached to the first end 14 or may be fixedly attached. The end cap 28 is made from a relatively soft sturdy material, such as rubber, plastic, etc.

A securement cap 30 has a proximal end 32 with an opening 34 therein and a distal end 36, as well as an upper surface 38 and a lower surface 40. As seen, the upper surface 38 of the securement cap 30 is rounded downwardly in proceeding from the proximal end 32 to the distal end 36 so that the distal end 36 is rounded or otherwise blunt. The securement cap 30 is made from an appropriate relatively soft material that will tend not to damage the interior roof surface R, door trim, or windows W of a vehicle V. Such materials include rubber, neoprene, a relatively soft plastic, a more sturdy material coated in one of these soft materials, etc. The second end 16 of the bar member 12 is received within the opening 34 of the securement cap 30, again, either removably or fixedly.

In order to use the vehicle garment hanging device 10 of the present invention, the device is assembled by passing the bar member 12 through the bar opening 24 of the ladder hook 18. The end cap 28 is attached to the first end 14 of the bar member 12 while the securement cap 30 is attached to the second end 16 of the bar member 12. The vehicle garment hanging device 10 is positioned within a vehicle V by hooking the ladder hook 18 to the garment hook H of the vehicle by hooking the hook H within one of the hook openings 26 of the ladder hook 18, the specific hook opening 26 chosen based on the particular configuration of the vehicle V in which the vehicle garment hanging device 10 is installed. As the ladder hook 18 is flexible, the portion of the ladder hook 18 above the hook opening 26 that receives the garment hook H of the vehicle V (between the chosen hook opening 26 and the top end 22) curves with the curvature of the roof R of the vehicle V. The bar member 12 is slid within the bar opening 24 of the ladder hook 18 until the distal end 36 abuts against either the roof R, the door or roof trim, or even possibly the window W of the vehicle V, depending on the particular configuration of the vehicle V and possibly the particular hook opening 26 used to hook onto the garment hook H of the vehicle V. The distal end 36 abutment against the roof R or the trim or possibly even the window W adds a second point of support for the vehicle garment hanging device 10. Clothes C laden hangers A are hung onto the bar member 12 as needed, between the ladder hook 18 and the end cap 28 with the end cap 28 helping prevent the hangers A from sliding off of the bar member 12. The weight of the hung items places a downward force on the bar member 12 with the ladder hook 18 acting as a fulcrum. This causes the portion of the bar member 12 between the ladder hook 18 and the securement cap 30 to tilt upward so that the rounded upper surface 38 of the securement cap 30 to press against the roof R of the vehicle V (or trim depending on configuration) with the rounding of the upper surface 38, mimicking the curvature of the roof R (or trim), helping achieve a more secure abutment of securement cap 30 against the roof R (or trim). This abutment of upper surface 38 of securement cap 30 against the roof R (or trim) and the distal end 36 of the securement cap 30 against either the roof R or trim or possibly even the window W of the vehicle V help hold the vehicle garment hanging device 10 steady even with a relatively heavy clothes C load. The soft nature of the securement cap 30 helps prevent tear or scuff damage to the roof R or trim and helps prevent potential glass breakage of the window W if the securement cap 30 abuts against and loses contact with the window W and thereafter thumps it, as might be occasioned when, for example, a large pothole is encountered by the vehicle V. The soft nature of the end cap 28 helps prevent injury to a passenger if such passenger inadvertently bumps the end cap 28.

One or more radial slots (not illustrated) can be placed onto a portion of the bar member 12 in order to receive the hangers A within the slots. Additionally, the ladder hook can be configured to have a bar opening on each end so that the bar member 12 is received within each of the two bar openings on the ladder hook so that when so received, the ladder hook forms a closed loop with the bar member. In such a configuration, the ladder hook can be looped over a passenger grab handle of the vehicle in order to install the vehicle garment hanging device onto such grab handle.

While the invention has been particularly shown and described with reference to an embodiment thereof, it will be appreciated by those skilled in the art that various changes in form and detail may be made without departing from the spirit and scope of the invention.

I claim:

1. A support device comprising:
    a bar member having a first end, an opposing second end, and a medial section therebetween;
    a unitary flexible ladder hook, that is monolithically formed from a single piece and having a top end and a bottom end, and having a front surface that is relatively flat whenever the ladder hook is in a normally relaxed non-flexed position, the ladder hook having an opposed rear surface opposite the front surface, whereby the front and rear surfaces are parallel to one another between the top and bottom ends, the ladder hook having a bar opening located proximate the bottom end that extends between the front surface and the back surface and a plurality of hook openings located between the bar opening and the top end each hook opening extending between the front surface and the back surface, such that the bar member slidably passes through the bar opening;
    an end cap located on the first end of the bar member;

a securement cap having a proximal end, a distal end, an upper surface and a lower surface, the securement cap located on the second end of the bar member; and wherein the ladder hook can be disposed in a non-flexed storage position whereby the front and rear surfaces are generally straight between the top and the bottom ends, and in a flexed use position whereby the ladder hook is bent at a location between the top end and the bar opening.

2. The support device as in claim 1 wherein the shape of the bar opening of the ladder hook corresponds to the shape of an outer surface of the bar member.

3. The support device as in claim 2 wherein each of the hook openings of the ladder hook is semi-circular in shape.

4. The support device as in claim 3 wherein the upper surface of the securement cap is downwardly curved from the proximal end to the distal end.

5. The support device as in claim 4 wherein the distal end of the securement cap is rounded.

6. The support device as in claim 4 wherein the upper surface and the distal end of the securement cap are each rubberized.

7. The support device as in claim 1 wherein each of the hook openings of the ladder hook are semi-circular in shape.

8. The support device as in claim 1 wherein the upper surface of the securement cap is downwardly curved from the proximal end to the distal end.

9. The support device as in claim 8 wherein the distal end of the securement cap is rounded.

10. The support device as in claim 1 wherein the upper surface and the distal end of the securement cap are each rubberized.

11. A support device comprising:
a bar member having a first end, an opposing second end, and a medial section therebetween;
a flexible ladder hook having a top end and a bottom end, a front surface that is relatively flat whenever the ladder hook is in a normally relaxed non-flexed position, the ladder hook having an opposed rear surface opposite the front surface, whereby the front and rear surfaces are parallel to one another between the top and bottom ends, the ladder hook having a bar opening located proximate the bottom end and extending between the front surface and the rear surface, and a plurality of spaced hook openings located between the bar opening and the top end, each hook opening extending between the front surface and the rear surface and each hook opening disposed a unique fixed, non-variable distance from the bar opening whenever the ladder hook is in the normally relaxed position, and such that the bar member slidably passes through the bar opening;
an end cap located on the first end of the bar member;
a securement cap having a proximal end, a distal end, an upper surface and a lower surface, the securement cap located on the second end of the bar member; and
wherein the ladder hook can be disposed in a non-flexed storage position whereby the front and rear surfaces are generally straight between the top and the bottom ends, and in a flexed use position whereby the ladder hook is bent at a location between the top end and the bar opening.

12. The support device as in claim 11 wherein the shape of the bar opening of the ladder hook corresponds to the shape of an outer surface of the bar member.

13. The support device as in claim 12 wherein each of the hook openings of the ladder hook are semi-circular in shape.

14. The support device as in claim 13 wherein the upper surface of the securement cap is downwardly curved from the proximal end to the distal end.

15. The support device as in claim 14 wherein the distal end of the securement cap is rounded.

16. The support device as in claim 14 wherein the upper surface and the distal end of the securement cap are each rubberized.

17. The support device as in claim 11 wherein each of the hook openings of the ladder hook is semi-circular in shape.

18. The support device as in claim 11 wherein the upper surface of the securement cap is downwardly curved from the proximal end to the distal end.

19. The support device as in claim 18 wherein the distal end of the securement cap is rounded.

20. The support device as in claim 11 wherein the upper surface and the distal end of the securement cap are each rubberized.

* * * * *